(No Model.)  
F. R. O'NEIL & H. C. STIFFL.  
WATER FILTER.  
No. 582,432.  
Patented May 11, 1897.  
3 Sheets—Sheet 3.
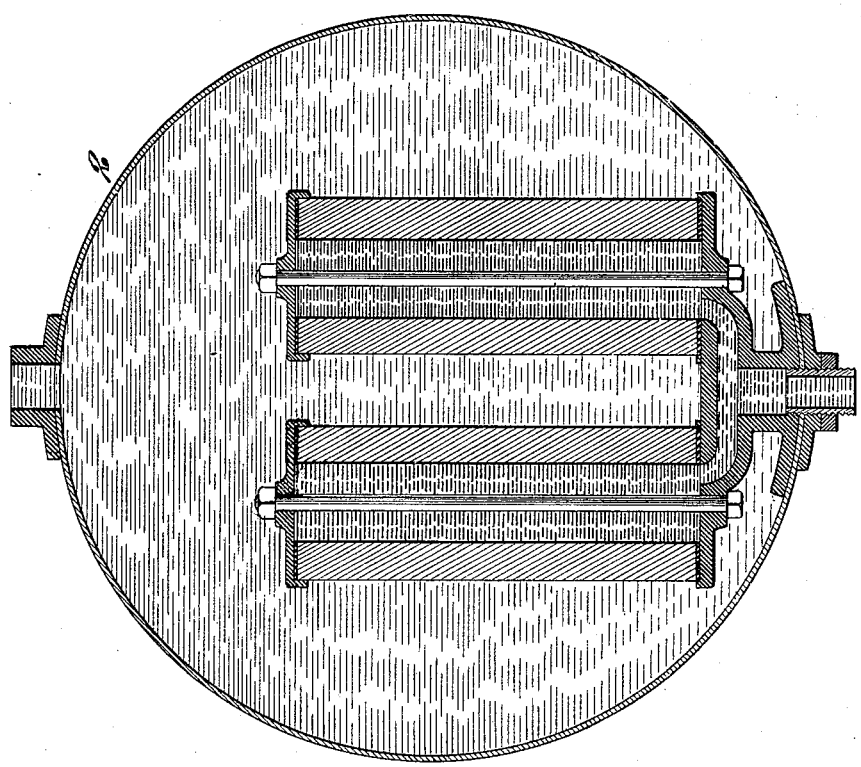
Fig. IV.
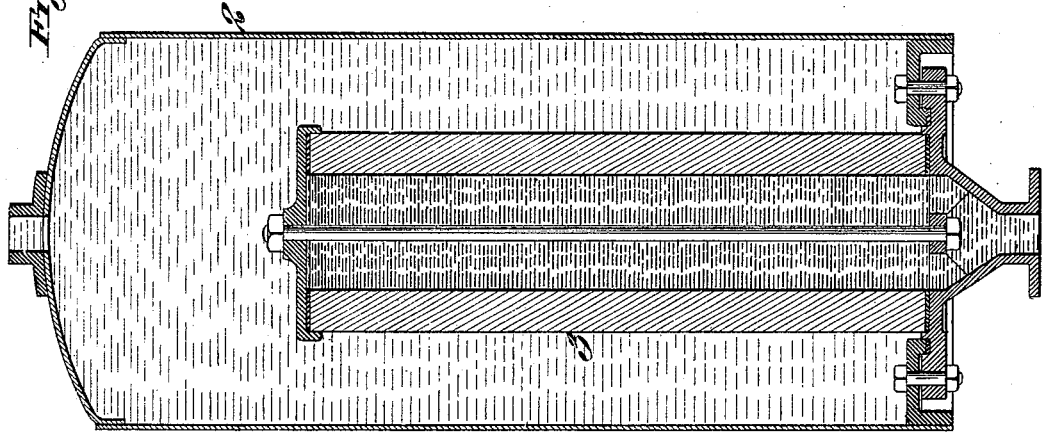
Fig. III.
Attest:  
E. S. Knight  
N. Finley
Inventors,  
Frank R. O'Neil  
Herman C. Stifel  
By Knight Bro$
Attys

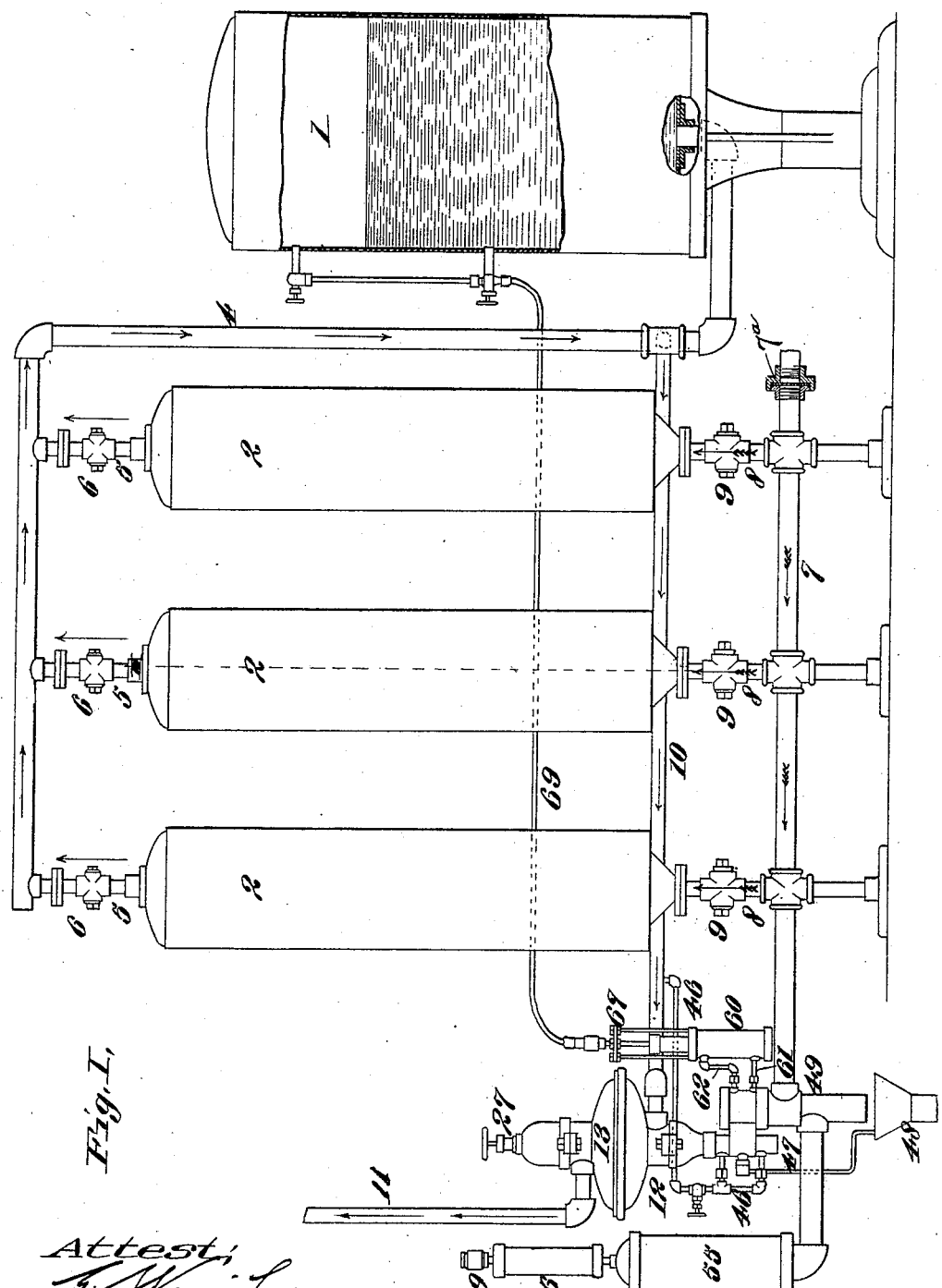

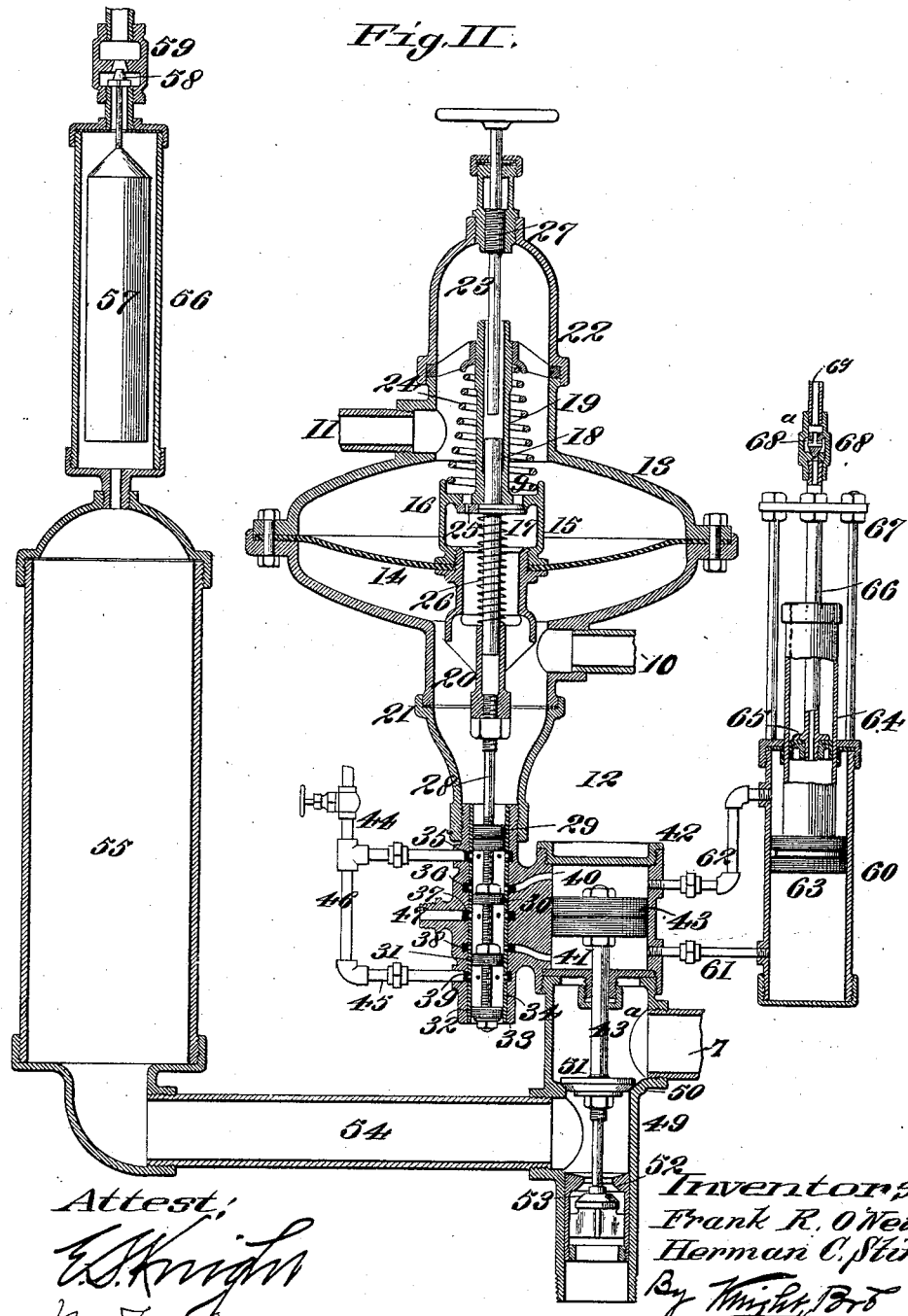

UNITED STATES PATENT OFFICE.

FRANK R. O'NEIL AND HERMAN C. STIFEL, OF ST. LOUIS, MISSOURI, ASSIGNORS TO THE AMERICAN TRIPOLI COMPANY, OF SAME PLACE.

WATER-FILTER.

SPECIFICATION forming part of Letters Patent No. 582,432, dated May 11, 1897.

Application filed January 18, 1897. Serial No. 619,638. (No model.)

*To all whom it may concern:*

Be it known that we, FRANK R. O'NEIL and HERMAN C. STIFEL, citizens of the United States, residing at the city of St. Louis, in the State of Missouri, have invented a certain new and useful Improvement in Water-Filters, of which the following is a full, clear, and exact description, reference being had to the accompanying drawings, forming a part of this specification.

Our present invention relates to certain improvements in water-filters that are automatically cleansing and in which the amount of waste at each wash is automatically controlled.

Our present invention consists in features of novelty hereinafter fully described, and pointed out in the claims.

Figure I is a side view illustrative of our invention. Fig. II is an enlarged detail vertical section. Fig. III is an enlarged section of one of the filtering-tanks, taken on line III III, Fig. I. Fig. IV is a vertical section showing a modified form of filtering-tank.

Referring to the drawings, 1 represents a clear-water storage-tank.

2 represents the filtering-tank, of which there may be one or more. We have shown three. These tanks may each have a single filtering stone or body 3, as shown in Fig. III, or each may have more than one stone, as shown in Fig. IV.

4 is a clear-water pipe connecting the storage-tank 1 with the filtering-tank 2. Each tank 2 has a short pipe 5, provided with a valve 6, that connects it to the pipe 4.

7 is the supply-pipe, communicating with the tanks 2 through branches 8, provided with valves 9. The branches 8 communicate with the interior of the stones 3, so that the water filters outwardly through the stones into the tanks 2 and then passes through the branches 5 and pipe 4 to the storage-tank 1.

11 represents the pipe that leads from the filtering apparatus to the building or place or places where the water is drawn for use. This pipe is shown connected to the pipe 4 near the storage-tank, but it may be connected directly to the tank. Located in this pipe is a valve device 12, the construction, operation, and function of which will now be described.

13 represents a chamber within which is a flexible diaphragm 14, to the central part of which is secured a hollow housing 15, having a valve-seat 16. Within the housing is a valve 17 on a stem 18, fitting loosely in a hollow extension 19 on the housing. The lower end of the stem 18 fits loosely in a hollow extension 20 on the bottom of the housing.

The chamber 13 has a lower extension 21, with which one section of the pipe 10 connects, as shown in Fig. II. The chamber has an upper extension 22, with which the outer section of the pipe 11 connects. When a faucet located in the clear-water pipe 11 is opened to draw water, and the pressure thus reduced above the diaphragm 14, the diaphragm, with the housing 15 and the valve 17, will be raised by the pressure of water beneath, and the upper end of the stem 18 will come against the lower end of the rod 23, that projects from the top of the extension 22 down into the hollow extension 19 of the housing 15. This will cause the valve 17 to be opened, and the water will pass to the open faucet. As soon as the faucet is closed the weight of the housing, accelerated by the spring 24, will cause the parts within the chamber 13 to return to their lower position, and this may be facilitated by making a small hole 25 in the valve 17, which permits a passage of water just as the valve is seating, so that the water-pressure above and below the diaphragm will be fully equalized.

The valve 17 is seated, when the stem 18 is not bearing against the rod 23, by a spring 26.

The rod 23 has preferably a threaded connection 27 with the extension 22, so that it may be adjusted up or down to cause the valve 17 to be open more or less at will.

Depending from the extension 20 is a rod 28, upon which are located piston-valves 29, 30, 31, and 32, located within a cylinder 33, that has a lining 34, provided with perforations opposite grooves 35, 36, 37, 38, and 39 in the cylinder. When the housing 15 is in its lower position, the valve 30 is between the grooves 36 and 37 and the valve 31 is between the grooves 38 and 39, and when the housing is raised, as described, the valve 30 is moved above the groove 36 and the valve 31 is moved above the groove 38. Communicating with the grooves 36 and 38, respectively, are ports 40 and 41, extending to a cylinder 42, within which is a piston 43. Communicating with the grooves 35 and 39 are respectively branches 44 and 45 of a pipe 46, that extends to the pipe 10, or, if preferred, and which would be the same thing, this pipe may extend to the storage-tank 1. Communicating with the groove 37 is a pipe 47, that leads to a pipe 48, that extends to a sewer or other place of discharge.

To the piston 43 is secured a rod 43ª, that extends down into a waste-pipe 49, that has a seat 50 for a valve 51 on the rod 48 and another seat 52 for a valve 53 on the rod. The pipe 49 is adapted to discharge into the sewer-pipe 48. The pipe 7 communicates with the pipe 49 above the valve-seat 50.

54 is a pipe that connects with the pipe 49 between the valve-seats 50 and 52. This pipe 54 extends to a tank 55, above which and communicating therewith is a chamber 56, provided with a float 57, having a valve 58, the seat of which is formed in a housing 59, that is open to the air.

60 represents a cylinder communicating by a pipe 61 with the lower part of the cylinder 42 and by a pipe 62 with the upper part of the cylinder 42. Within the cylinder is a piston 63, having a large hollow stem 64, that plays through the upper head of the cylinder 60. Within the stem 64 is a piston-valve 65, the cup-leather packing of which is presented downwardly. The piston-valve 65 is secured to the lower end of a tube 66, that extends loosely through the upper end of the stem 64 and is made fast to a fixed support 67. To the tube 66 is secured a housing 68, from which extends a pipe 69 to the storage-tank.

68ª is a check-valve within the housing 68.

The operation is as follows: When the housing 15 rises upon the opening of a faucet, as described, it lifts the valves on the stem 28. This closes the communication between the pipe 46 and the upper part of the cylinder 42 and opens communication between the upper part of the cylinder and the exhaust-pipe 47, for the valve 30 will be moved to a position above the groove 36. This movement of the valves opens up a communication between the pipe 46 and the lower part of the cylinder 42, for the valve 31 will be moved to a position above the groove 38, and the water in pipe 46 under the pressure contained in the storage-tank will lift the piston 43, thus opening valve 51 and closing valve 53. The pipe 7, with which the filtering-tanks communicate, is now opened to the tank 55 and water will be forced back through the filtering-stones under the pressure in the storage-tank to remove the sediment thereon, this flow of water continuing until the tank 55 is filled and the float 57 raised to close valve 58, and the flow of water will cease. The size of the tank 55 is such as will permit a sufficient flow of water back through the stones to clean them, and by its use there is no unnecessary loss or waste of water, as there would be many times in the absence of the tank 55 and valve 53, for then the water would continue to waste as long as the faucet in the building remained open, which in some instances—as, for example, in filling a bath-tub—is for a considerable length of time.

The above-described construction provides for the opening of the valve in the waste-pipe by the same force that causes a reflux of water through the filtering-tank, so that the pressure if present for the one purpose is also for the other.

When the faucet is closed and the housing 15 descends, the valves on stem 25 are moved back to the position shown in Fig. II, and the water will then pass (under the pressure contained in the storage-tank) from pipe 46 to the cylinder 42, above the piston 43, while the water beneath the piston exhausts through the port 41 and pipe 47. This causes the piston 43 to descend, thus closing valve 51 and opening valve 53, which shuts off pipe 7 from the tank 55 and opens tank 55 to the sewer or waste.

When the housing 15 descends, forcing the valves on rod 28 to the position shown in Fig. II, part of the water that enters the cylinder 42 above the cylinder 43 passes on through pipe 62 into the cylinder 60 above the piston 63, causing the piston, with its hollow stem 64, to descend, the result of which is that the air will enter the stem 64 around the tube 66 and will pass down around the cup-leather of the valve 65 to supply the vacuum in the stem beneath the valve. As the piston 63 thus descends the water escapes from beneath it through pipe 61 into the lower part of the cylinder 43 and out through port 41 to pipe 47. When the housing 15 raises the valves on rod 28 to admit water to the cylinder 42, as explained, part of this water will pass into the lower part of cylinder 60 through pipe 61 and will lift the piston 63 and its stem 64, and the air contained beneath piston 65 will now be forced through check-valve 68ª and pipe 69 to the closed storage-tank 1, and the latter is thus kept constantly supplied with compressed air that serves to force the water to the different points in the building when faucets are opened.

The supply-pipe 7 is provided with a disk 7ª, having a small opening, and when the filtering-tanks are open to the tank 55 the flow of water from the former to the latter is not materially interfered with, owing to this disk in the supply-pipe back of where the supply-pipe connects with the filtering-tanks.

By using a filtering-tank considerably larger than the filtering stones or medium, as shown in Fig. IV, a separate storage-tank for the clear water is in some cases unnecessary.

We claim as our invention—

1. In a water-filter, the combination of a filtering-tank, a storage-tank, a pipe connecting the filtering-tank to the storage-tank, a waste-pipe, a supply-pipe, and a valve device controlling the flow of water from the filtering-tank through the waste-pipe, and which is arranged to be acted upon by pressure of water contained in the storage-tank, whereby the pressure on the storage-tank serves to open the filtering-tank to the waste-pipe, and also cause a reflux of water through the filtering-tank to the waste-pipe when said valve device is open, substantially as set forth.

2. In a water-filter, the combination of a filtering-tank, a storage-tank, a pipe connecting the filtering-tank to the storage-tank, a waste-pipe, a supply-pipe, and an automatic valve device controlling the flow of water from the filtering-tank through the waste-pipe, and which is arranged to be acted upon by the pressure of water contained in the storage-tank, whereby the pressure in the storage-tank serves to open the filtering-tank to the waste-pipe and also causes a reflux of water through the filtering-tank to the waste-pipe when said valve device is opened, substantially as set forth.

3. The combination in a water-filter of a filtering-tank, a storage-tank, a supply-pipe, a pipe connecting the filtering-tank to the storage-tank, a waste-pipe, a clear-water-discharge pipe, a chamber located in the last-mentioned pipe, a diaphragm contained in the chamber, a valve-housing secured to the diaphragm, a valve device located in the waste-pipe, a pipe leading from the storage-tank to said valve device, and a valve mechanism arranged to be operated by the movement of said valve-housing, substantially as and for the purpose set forth.

4. In a water-filter, the combination of a filtering-tank, a storage-tank, a pipe connecting the filtering-tank to the storage-tank, a supply-pipe, a clear-water-discharge pipe, a chamber located in said last-mentioned pipe, a diaphragm located in said chamber, a housing secured to said diaphragm, a valve within the housing, and a stop-rod, substantially as and for the purpose set forth.

5. The combination in a water-filter, of a filtering-tank, a storage-tank, a pipe connecting the filtering-tank to the storage-tank, a supply-pipe, a waste-pipe, a tank 55 for wash-water communicating with the waste-pipe, and a valve device for controlling the flow of water from the filtering-tank to said tank 55, and which also controls the flow of water from the latter tank through the waste-pipe, substantially as set forth.

6. The combination in a water-filter of a filtering-tank, a storage-tank, a pipe connecting the filtering-tank to the storage-tank, a supply-pipe, a waste-pipe, a tank 55 communicating with the waste-pipe, and an automatic valve device for controlling the flow of water from the filtering-tank to said tank 55, and for controlling the flow of water from the latter tank through the waste-pipe, substantially as set forth.

7. In a water-filter, the combination of a storage-tank, a waste-pipe, a supply-pipe through which water passes to the filtering medium, a valve device which controls the communication between the receiving side of the filtering medium and the waste-pipe, and an automatic device for actuating the valve device, whereby said valve device is operated by the pressure in the storage-tank acting upon said automatic device, substantially as set forth.

8. The combination in a water-filter of a filtering-tank, a storage-tank, a pipe connecting the filtering-tank to the storage-tank, a supply-pipe, a waste-pipe, a tank 55, valves located in the waste-pipe, and a means for operating said valves simultaneously whereby the discharge through the waste-pipe will be closed when the filtering-tank is open to the tank 55, and whereby the flow of water from the filtering-tank to the tank 55 is closed when the latter tank is open to the waste-pipe, substantially as and for the purpose set forth.

9. In a water-filter, the combination of a filtering-tank, a storage-tank, a pipe connecting the filtering-tank to the storage-tank, a supply-pipe, a waste-pipe, a tank 55 adapted to be placed in communication with the filtering-tank, a valve arranged to stop the flow of water from said tank 55 when the tank is in communication with the filtering-tank, and a valve arranged to open communication from said tank 55 through the waste-pipe when communication between the filtering-tank and said tank 55 is closed, substantially as set forth.

10. The combination in a water-filter of a filtering-tank, a storage-tank, a pipe connecting the filtering-tank to the storage-tank, a supply-pipe, a tank 55 for wash-water communicating with the waste-pipe and provided with a float-valve, and a valve device in the waste-pipe whereby the reverse flow of water through the filtering-tank during the cleaning operation is controlled, substantially as set forth.

11. In a water-filter, the combination of a filtering-tank, a storage-tank, a pipe connecting the filtering-tank to the storage-tank, a supply-pipe, a clear-water-discharge pipe, a waste-pipe, a valve device located in the waste-pipe, a water-pipe 46, and a valve mechanism moved by the pressure of water in said discharge-pipe for controlling the flow of water from said pipe 46 to said valve device, substantially as and for the purpose set forth.

12. In a water-filter, the combination of a filtering-tank, a storage-tank, a pipe connecting the storage-tank to the filtering-tank, a supply-pipe, a valve device, a cylinder 60 communicating with said valve device, a piston 63 located in said cylinder and having a hollow stem 64, a piston-valve located in said stem and having a downwardly-presented cup-leather, a tube to which the last-mentioned valve is secured, and a pipe provided with a check-valve and which connects said tube to the storage-tank, substantially as set forth.

FRANK R. O'NEIL.
HERM. C. STIFEL.

In presence of—
GEO. H. KNIGHT,
STANLEY STONER.